Figure 1:
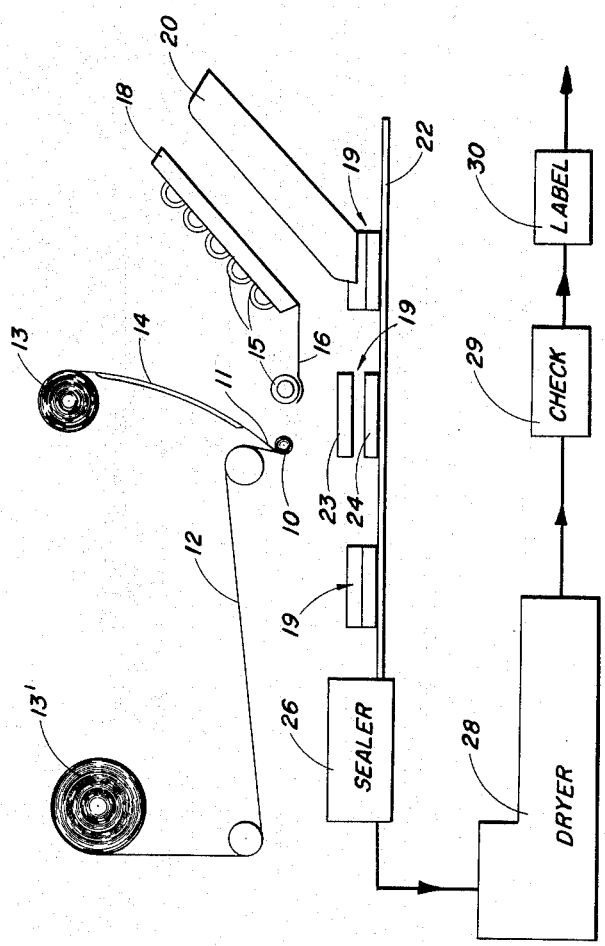

Jan. 4, 1966    C. R. WILSON ET AL    3,226,816
METHOD AND MACHINE FOR PACKAGING ROLL FILM
Filed Feb. 28, 1963    2 Sheets-Sheet 1

CLARENCE R. WILSON
CLIFFORD B. BUSHNELL
ROBERT J. HERBERGER
RALPH T. CARLSON
INVENTORS

BY R. Frank Smith
David P. Ogden
ATTORNEYS

Jan. 4, 1966  C. R. WILSON ETAL  3,226,816
METHOD AND MACHINE FOR PACKAGING ROLL FILM
Filed Feb. 28, 1963  2 Sheets-Sheet 2

CLARENCE R. WILSON
CLIFFORD B. BUSHNELL
ROBERT J. HERBERGER
RALPH T. CARLSON
INVENTORS

BY *R. Frank Smith*
*David P. Ogden*

ATTORNEYS ably of the drawings in the manufacture of practical cassettes of this type. For instance,

United States Patent Office 3,226,816
Patented Jan. 4, 1966

3,226,816
METHOD AND MACHINE FOR PACKAGING ROLL FILM
Clarence R. Wilson, Clifford B. Bushnell, Robert J. Herberger, and Ralph T. Carlson, Rochester, N.Y., assignors to Eastman Kodak Company, Rochester, N.Y., a corporation of New Jersey
Filed Feb. 28, 1963, Ser. No. 261,732
18 Claims. (Cl. 29—430)

This invention relates to a film packaging arrangement and, more particularly, to a machine and method for rolling film, and placing it in a light-tight cassette ready for use.

In the art of amateur photography, there is a continual effort to provide film packaging arrangements which are substantially foolproof in the hands of an inexperienced photographer. One example of such a film package is the metal can which contain 35 mm. film whereby the amateur may carry the film in his pocket, drop the can and film, etc., without any appreciable damage to the finished print. However, with certain types of cameras, one sometimes experiences difficulty in tightly threading this 35 mm. film on the take-up spool. Sometimes, attempts are made to unroll the film past the end of the film available which may detach it from the spool in the can. Also, an inexperienced photographer can forget to rewind the film prior to opening the camera. Such practices ruin many pictures each year. These practices can be substantially eliminated by providing a film cassette wherein the film is initially secured only to the take-up spool and enclosed so that it need not and cannot be rewound after a picture-taking sequence is completed.

However, there are many problems relating to the manufacture of practical cassettes of this type. For instance, the cassette should be arranged so that it is substantially impossible for it to be mounted in a reversed position within the camera itself. One arrangement which will prevent improper insertion is to have a spool on only one end of the cassette whereupon the film may be wound during the picture-taking operation. By this construction, the other end of the cassette may be made smaller and will fit in only one end of the camera housing. As will become apparent from the following detailed description, the film loading of such a cassette arrangement requires several new and unobvious mechanisms to accomplish several novel steps.

Therefore, a primary object of the present invention is to provide a new and reliable film packaging arrangement.

In connection with one embodiment of our invention, a mandrel is provided for winding thereon a strip of backing paper having interleaved therewith a strip of film. A take-up spool supply means presents take-up spools to be secured to a leader of the backing paper when the winding operation is completed. After this leader is secured to the take-up spool, the film coil and the spool form a scroll which is placed in a cassette housing having pockets selectively receptive of the end portions with a film positioning plane surface therebetween. When the cassette is placed within a camera, the film positioning plane will locate the film surface so that the lens may properly focus the image on the light-sensitive emulsion of the film. Means are also provided for placing the cover on the filled cassette housing and securing the two parts together to form a light-tight arrangement.

Figure 2:
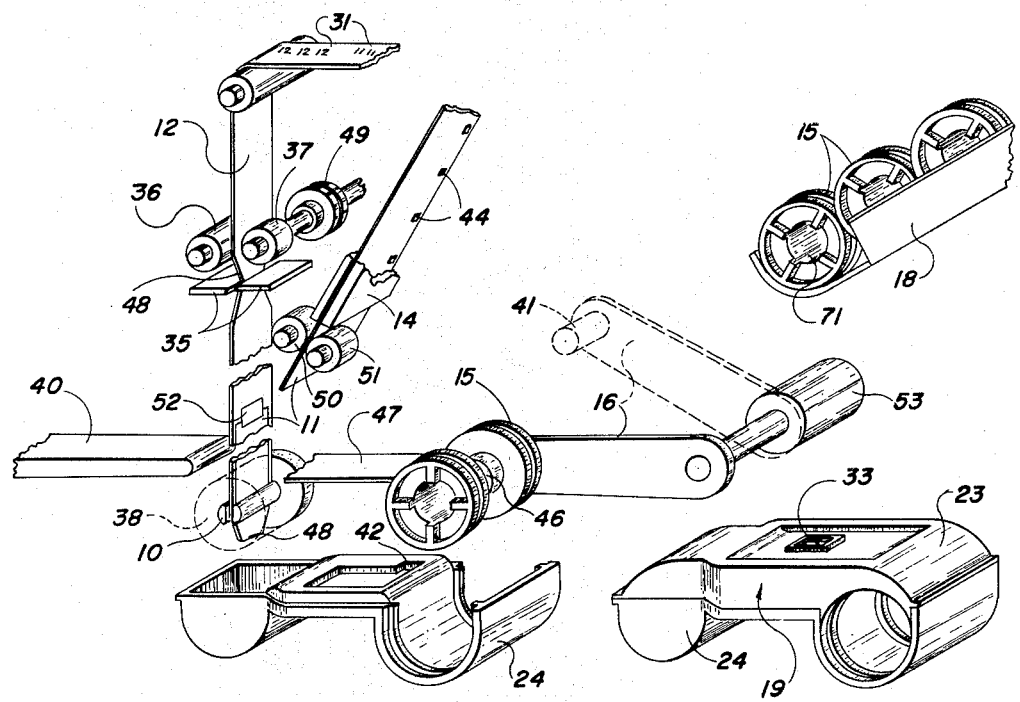
Figure 3:
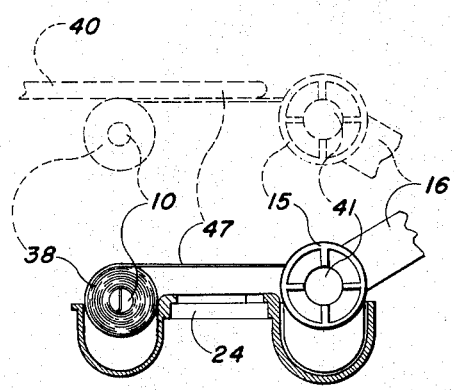

The subject matter which is regarded as our invention is particularly pointed out and distinctly claimed in the concluding portion of this specification. The invention, however, as to its organization and operation, together with further objects and advantages thereof, will best be understood by reference to the following description taken in connection with the accompanying drawings in which:

FIG. 1 is a schematic plan view of our invention;
FIG. 2 is a schematic perspective view of a scroll forming station; and
FIG. 3 is a plan view of the cassette loading station.

Referring now to the drawings wherein like numbers refer to similar parts, there is shown in FIG. 1 at a scroll forming station a reusable winding mandrel 10 receptive of a strip of film 11 and a backing paper 12 supplied in web form from roll supplies 13 and 13' respectively with the film passing through an enclosed guide 14 which protects the film from dust and stray light. A take-up spool 15 is held in a predetermined position relative to the mandrel 10 by a support arm 16 which delivers individual spools from a supply chute 18. A plurality of cassettes 19 are supplied by a second supply chute 20 to a conveyor arrangement 22. In the region of the mandrel 10 a cassette cover 23 is raised from a lower housing portion 24 so that the completed film scroll, including the attached take-up spool, may be placed therein. Thereafter, the cover 23 is replaced and the filled cassette 19 proceeds on the conveyor 22 to a sealing station 26.

After the filled cassettes 19 are sealed at the sealing station 26, they are dried in a drying station 28 and from there proceed through a check station 29 and a labeling station 30.

The sealing station 26 can be arranged in several ways to provide seals between the cover 23 and the housing 24 of the cassette 19. The use of solvents placed along the mating seam of the two portions of the cassette accomplishes an integral connection therebetween, as does the use of heat locally applied to the same seam or the use of an ultrasonic sealing arrangement. In any case, the cassette portions are usually partially melted along the mating surfaces whereupon they must be maintained under pressure in the chamber of the drying station 28 until the soft portions have hardened sufficiently to assure no springback. The cassettes 19 are designed to provide a tight fit between the two portions thereof so that the film will be properly positioned for accurate focusing when placed in a camera. The cassettes may also be sealed by use of one or more pasters (not shown) to hold the cover 23 on the housing 24. Such tapes or pasters are well known in the packaging art and need not be described in detail herein.

After the cassettes 19 are properly sealed, they are conveyed to the test station 29, where the take-up spool 15 is rotated enough to determine whether the film roll is jammed in its cavity.

Referring now to FIG. 2, which illustrates the scroll forming station, we have shown in greater detail the paper and film handling portions of our invention. We prefer to encode the rear surface of each backing paper 12, with numerals as at 31 so that the camera operator will be able to see through a window 33 in the cover 23 the number of the picture being exposed. As illustrated in FIG. 2, when the backing paper is presented as a continuous web, a cutter arrangement 35 is in operating position to separate two backing papers. At the same time, the cutter arrangement 35 is operated, back-up roller 36 is removed from a driving roller 37 to stop the paper 12 so that the various scroll forming operations described below can be completed before the backing paper proceeds to form a next roll.

Referring now to the region of the mandrel 10, once a spoolless roll is completed (as illustrated at 38 in dashed lines) with the film 11 interleaved within the backing paper 12, a throwover arm 40 positions the paper leader against the take-up spool 15. As mentioned above, the take-up spool 15 is held in a predetermined location at the scroll forming station by a support pin 41 of the support arm 16. The leader portion is secured to the spool 15 so that future rotation of the spool will uncoil the roll 38 and place sensitized film in an image receptive position in the cassette 19. Proper positioning of each picture frame is assured by a pawl (not shown) of the camera which engages the film through an aperture or recess 42 in the housing 24 and stops the tape-up operation in the camera when this pawl senses one of a plurality of apertures 44 in the film 11. The leader of the paper backing 12 may be secured to the take-up spool 15 by any convenient method. However, we prefer to use an adhesive paster 46 which may be applied in accordance with the teachings of the patent to Wallace et al. 2,940,232 issued June 14, 1960. Moreover, the present arrangement is cam timed, hydraulically operated, and provided with electrical interlocks and automatic stops of the general type shown and described in the patent to Edwards et al. 2,776,094 issued January 1, 1957, as well as the above-mentioned Wallace et al. patent. Since many such interlock arrangements are now well known, the details thereof need not be set forth herein.

Once the film and backing paper are wound in the roll 38 on the mandrel 10 and the leader is fastened to the spool 15, a completed scroll 47 is formed. This scroll 47 is then dropped in a cassette housing 24, as described in more detail below. The empty mandrel 10, the support arm 16 and the other portions of the equipment are returned to a ready position to initiate rolling of another coil of film and backing paper. When the mandrel 10 is in a position to receive a trailing end of another strip of backing paper, an interlock of the type set forth in the above-mentioned Edwards et al. patent is energized to cause the back-up roller 36 to engage the drive roller 37 whereupon the paper is driven toward the mandrel 10. As a leading tab 48 enters the region of the slot of the mandrel 10, the mandrel is extended and positioned on both sides of the tab 48 to accomplish the threading thereof by mechanical or hydraulic means as are well known in the art of complex machinery.

Initially, when the tab 48 is within the slot of the mandrel 10, the mandrel starts to wind the backing strip 12 at about the same speed the strip is being driven by the driving roller 37. However, because the size of the roll 38 soon becomes substantially greater by convolution growth, the paper is pulled faster than the speed at which the roller 37 is driving the paper 12. This overspeed of the paper automatically causes an overdriving clutch means 49 to disconnect the driving roller 37. As the backing paper proceeds toward the mandrel 10, motion of the film 11 toward the mandrel 10 is selectively initiated by engagement of a back-up roller 50 to push the film against a second driving roller 51. In order to provide a 1:1 ratio of velocities of the film 11 and the paper 12, the driving roller 51 is coupled directly to be driven by the roller 37 in a 1:1 ratio. Thus, the surface speed of the film driving roller 51 and the backing paper driving roller 37 are identical, irrespective of the speed of the mandrel 10. Such a relationship presents the apertures 44 in the film 11 at locations in registry with the numerals 31 on the paper 12.

As the winding operation reaches a certain point, the leading or take-off end of the film strips 11 are secured to the backing strip by a paster 52 in accordance with known methods, as discussed in the Edwards et al. patent, cited above, which need not be described in detail here. Shortly thereafter, the mandrel 10 is stopped to provide a leader to fasten to the spool 15. This arrangement provides a spoolless roll wherein both ends of the backing paper extend beyond the film 11 to provide stray light protection, as is the usual case in roll films.

Thus, it is readily seen that we have prepared the scroll 47 for use in the cassette 19 including the steps of coupling the paper strip 12 to the mandrel 10, winding it thereon while interleaving, in a registered relationship therewith, the film strip 11 and finally cutting the web of the backing strip 12 and securing the leading end to a blank tape-up spool 15. After being formed as discussed above, the entire scroll 47 is placed in the cassette housing 24.

Referring now to FIG. 3, we have illustrated in more detail a cassette loading station arranged for placing the scroll 47 in the housing 24. The cassette 19 travels (right to left as shown in FIG. 3) in response to intermittent motion of the conveyor 22. When the cassette 19 reaches the loading station, the cover 23 is lifted by some means such as a vacuum lifter (not shown). After the cover 23 has been lifted from the housing 24 at the loading station, the cassette housing 24 is ready to receive the completed scroll 47.

When the scroll is completed as discussed in connection with FIG. 2 and as illustrated in dashed lines in FIG. 3, the mandrel 10 is lowered so that the roll 38 is partially inserted in the housing 24 and the support arm 16 is similarly lowered so that the spool 15 is partially inserted in the housing 24. Once in the lowered position, the mandrel 10 and the support pin 41 are retracted by means such as a pneumatic piston 53 (FIG. 2), whereby the scroll 47 is dropped into the housing 24. After the retraction of the support pin 41 and the mandrel 10, these portions are raised with the mandrel being oriented with the slot thereof in a vertical position to receive another backing paper strip 12 and the support arm 16 returning to pick up an additional blank spool 15, as indicated in dashed lines in FIG. 2. In picking up another spool 15, the support pin 41 is again extended into the spool cavity by the pneumatic piston 53. Similarly, the throw-over arm 40 is returned to its ready position and the cover 23 is placed on the filled cassette housing 24. The conveyor 22 then advances to move the loaded cassette toward the sealer station 26 and to place the next cassette 19 so that its cover may be removed and the housing 24 may receive a next completed scroll 47.

While we have shown and described particular embodiments of the present invention, other modifications may occur to those skilled in this art. For instance, many interlock and timing arrangements may be used to regulate, by way of example, the relationship between the numerals 31 on the backing paper 12 and the apertures 44 of the film 11. Similarly, the cutter arrangement 35 may be omitted if the backing papers are precut. We intend, therefore, to have the appended claims cover all modifications which fall within the true spirit and scope of our invention.

We claim:
1. A machine for packaging roll film comprising:
a take-up spool supply chute;
a scroll forming station;
a cassette loading station;
a cassette sealing station;
a support arm movable between said spool supply chute, said scroll forming station and said loading station, said arm having a support pin to receive a spool at said supply chute and carry it sequentially to said scroll forming station and to said loading station;
mandrel means at said scroll forming station for receiving and coiling the back paper thereon;
a film driver selectively operable for driving a precut film toward the mandrel to be interleaved in registered relation with the backing paper;
means to sever the web from the backing paper on said mandrel to provide a leader for the roll on said mandrel;
means for moving the leader toward said spool to enhance coupling the backing paper leader to said spool to form the scroll;
means to lower the scroll to a cassette housing;
means to place a cover on the filled cassette housing;
means for removing the filled cassette from said cassette loading station; and
means for conveying said filled and covered cassette to said sealing station.

2. A machine for packaging roll film comprising:
a take-up spool supply chute;
a scroll forming station;
a cassette loading station;
a support arm movable between said spool supply chute, said scroll forming station and said loading station to receive a spool at said supply chute and transport it sequentially to said scroll forming station and to said loading station;
mandrel means at said scroll forming station for receiving and coiling the backing paper thereon;
driving means for driving a film toward said mandrel to be interleaved in registered relation with the backing paper;
means to couple a backing paper leader to said spool to form a scroll;
means to lower the scroll to a cassette housing;
means to place a cover on the filled cassette housing; and
means for removing the filled cassette from said cassette loading station.

3. A machine for packaging roll film comprising:
a take-up spool supply chute;
a scroll forming station;
a support arm movable between said spool supply chute and said scroll forming station to receive a spool at said chute and carry it to said scroll forming station;
mandrel means at said scroll forming station for receiving and coiling a backing paper thereon;
means for supplying a backing paper web to said mandrel;
driving means drivingly coupled to said backing paper for driving a precut film toward said mandrel to be interleaved with a preselected portion of the backing paper;
means to sever the web from the backing paper roll on said mandrel to provide a leader;
means to couple the backing paper leader to said spool to form the scroll; and
means for separating the completed roll from said mandrel and the attached spool from said support arm.

4. A machine for packaging roll film comprising:
a scroll forming station;
a support means to receive a take-up spool and carry it to said scroll forming station;
reusable mandrel means at said scroll forming station for receiving and coiling a backing paper thereon without a spool;
means for supplying a backing paper web to said mandrel;
driving means for driving film toward said mandrel to be interleaved with a preselected portion of the backing paper;
means to sever the web from said backing paper on said mandrel at a point remote from the roll to provide a take-off leader; and
means to couple the backing paper leader to said spool to form the scroll.

5. A machine for packaging roll film comprising:
a scroll forming station;
a cassette loading station;
a spool supply;
means for supplying to said scroll forming station a backing paper web;
means for supplying to said scroll forming station a film having spaced-apart apertures;
a rotatable mandrel at said scroll forming station receptive of the backing paper web and the film for coiling them in an interleaved relationship to form a roll;
web driving means for initially placing an end of the backing paper web within the control of said mandrel;
means for driving said mandrel to pull the web through said web driving means at velocities greater than the supply thereof to said mandrel;
means for presenting a film to be interleaved with said web;
a cutter arrangement operable to sever one complete backing paper from the web to provide a leader on said roll;
a support pin drivable to pick up one take-up spool from said spool supply and position it at said scroll forming station;
a throw-over arm arranged to engage the leader of said complete backing paper roll and position the end thereof adjacent to said take-up spool for securing thereto;
means for positioning an empty cassette housing at said cassette loading station;
means for moving said scroll toward said empty housing;
means for retracting said mandrel; and
means for retracting said support pin, said cassette positioning means being drivable for moving from said cassette loading station.

6. A machine for packaging roll film comprising:
a spool supply;
means for supplying a backing paper web;
means for supplying a film having spaced-apart apertures;
a rotatable mandrel receptive of the backing paper web and the film for coiling them in an interleaved relationship to form a roll;
web driving means for initially placing an end of the backing paper web within the control of said mandrel;
means for driving said mandrel to pull the web through said web driving means at velocities greater than the supply thereof to said mandrel;
film driving means drivable by said mandrel and arranged to engage the film in accordance with the position of said web;
a cutter arrangement operable to sever one complete backing paper from the web in accordance with the amount thereof in the roll on said mandrel to provide a take-off leader;
a support pin drivable to pick up one take-up spool from said spool supply and position it in a spaced-apart position relative to said mandrel;
a throw-over arm arranged to engage the leader of said complete backing paper and position the end thereof adjacent to said take-up spool to enhance attaching the leader end to said take-up spool to form a scroll;
means for moving said scroll toward an empty housing;
means for retracting said mandrel; and
means for retracting said support pin.

7. A machine for packaging roll film comprising:
a scroll forming station;
a cassette loading station;
a support arm movable between said scroll forming station and said loading station arranged to receive a spool and transport it sequentially to said scroll forming station and to said loading station;
reusable mandrel means at said scroll forming station for receiving and coiling the backing paper thereon;
driving means for driving a film toward said mandrel to be interleaved in registered relation with the backing paper;
means to couple a backing paper leader to said spool to form a scroll; and
means to lower the scroll to a cassette housing.

8. A machine for packaging roll film comprising:
a scroll forming station;
a support means to receive a take-up spool and carry it to said scroll forming station;
reusable mandrel means at said scroll forming station for receiving and coiling a preselected length of backing paper thereon;

means for supplying a backing paper web to said mandrel;

driving means for driving film toward said mandrel to be interleaved with a preselected portion of the backing paper;

said mandrel means, being stoppable at a point providing a take-off leader for the spoolless roll formed thereon; and means to couple the backing paper leader to said spool to form a scroll.

9. A machine for packaging roll film comprising:

means for supplying a backing paper web;

means for supplying a film having spaced-apart apertures;

a rotatable mandrel receptive of the backing paper web and the film for coiling them in an interleaved relationship to form a roll;

web driving means for initially placing an end of the backing paper web within the control of said mandrel;

means for driving said mandrel to pull the web through said web driving means at velocities greater than the supply thereof to said mandrel;

film driving means drivable by said mandrel and arranged to engage the film in accordance with the position of said web;

a cutter arrangement operable to sever one complete backing paper from the web in accordance with the amount thereof in the roll on the mandrel to provide a take-off leader;

a support arm drivable to pick up one take-up spool and position it in a spaced-apart position relative to said mandrel; and a throw-over arm arranged to engage the leader of said complete backing paper and position the end thereof adjacent to said take-up spool to enhance attaching the leader end to said take-up spool.

10. A method for packaging film comprising the steps of:

winding a backing paper in a coil with a leader left unwound;

concurrently interleaving a film in the backing paper coil;

attaching a take-up spool to the leader of the coiled backing paper to form a scroll;

placing the scroll in a cassette housing;

placing a cover on the filled cassette housing; and securing the cover to the housing.

11. A method for packaging roll film comprising the steps of:

winding a backing paper in a coil with a leader strip left unwound while concurrently interleaving a film in the backing paper coil;

attaching a take-up spool to the leader of the coiled backing paper to form a scroll;

placing the scroll in a cassette housing;

placing a cover on the filled cassette housing; and securing the cover to the housing so that the film is protected from light while the take-up spool is available for winding the backing paper thereon.

12. A method for packaging film comprising the steps of:

winding a backing paper in a coil with a leader left unwound;

concurrently interleaving a film in the backing paper coil;

securing a leading end of the film to the backing paper;

attaching a take-up spool to the leader of the coiled backing paper to form a scroll; and placing the scroll in a cassette housing.

13. A method for packaging roll film comprising the steps of:

winding a backing paper into a coil;

concurrently interleaving a film in the backing paper coil;

securing a take-off end of the film to the backing paper;

stopping the winding operation prior to winding a complete backing paper to provide a take-off leader for the coiled backing paper;

attaching a take-up spool to the take-off leader of the coiled backing paper to form a scroll;

placing the scroll in a cassette housing;

placing a cover on the filled cassette housing; and securing the cover to the housing so that the film is protected from light while the take-up spool is available for winding thereon the backing paper including the film secured thereto.

14. A method for packaging roll film comprising the steps of:

winding a backing paper in a spoolless coil;

concurrently interleaving a shorter film within the backing paper coil;

securing a leading end of the film to the backing paper;

stopping the winding operation after the securing operation to provide a take-off leader backing paper portion;

attaching a take-up spool to the take-off leader portion to form a scroll; and placing the scroll in a cassette housing.

15. A method for packaging roll film comprising the steps of:

winding a backing paper in a spoolless coil with a leader portion left unwound;

concurrently interleaving a shorter film within the backing paper coil;

securing a leading end of the film to the backing paper; and attaching a take-up spool to the leader portion to form a scroll.

16. A method for packaging roll film in the form of a scroll having only one spool comprising the steps of:

winding a backing paper into a spoolless coil;

concurrently interleaving a film into a central portion of the backing paper coil;

securing a take-off end of the film to the backing paper;

stopping the winding operation prior to winding a complete backing paper to provide a take-off leader for the coiled backing paper;

attaching a take-up spool to the take-off leader of the coiled backing paper to form a scroll with sufficient spacing between the spoolless coil and the spool for providing a photographic image;

placing the scroll in a cassette housing;

placing a cover on the filled cassette housing; and securing the cover to the housing so that the film is protected from light while the take-up spool is available for winding thereon the backing paper and the film thereto.

17. A method for making roll film in the form of a scroll having only one spool comprising the steps of:

threading a backing paper on a mandrel;

winding a backing paper onto the mandrel to form a spoolless coil;

concurrently interleaving a shorter film into a central portion of the backing paper coil;

securing a take-off end of the film to the backing paper;

stopping the winding operation prior to winding a complete backing paper to provide a take-off leader for the coiled backing paper; and attaching a take-up spool to the take-off leader of the coiled backing paper to form a scroll with sufficient spacing between the spoolless coil and the spool for providing a photographic image receptive region.

18. A method for forming roll film in the form of a scroll having only one spool comprising the steps of:

threading a backing paper on a mandrel;

winding a backing paper onto the mandrel to form a spoolless coil;

concurrently interleaving a shorter film into a central portion of the backing paper coil;

securing a take-off end of the film to the backing paper;

stopping the winding operation prior to winding a complete backing paper to provide a take-off leader for the coiled backing paper;

attaching a take-up spool to the take-off leader of the coiled backing paper to form a scroll; and placing the scroll in a cassette housing with sufficient spacing between the spoolless coil and the spool for providing a photographic image receptive region.

References Cited by the Examiner

UNITED STATES PATENTS 2,776,094  1/1957  Edwards _____ 242—55.11
2,940,232  6/1960  Wallace _____ 53—112

WHITMORE A. WILTZ, *Primary Examiner.*

THOMAS H. EAGER, *Examiner.*